United States Patent [19]
Takahashi et al.

[11] 3,810,395
[45] May 14, 1974

[54] WORM AND RECIPROCATING BALL TYPE STEERING GEAR FOR MOTOR VEHICLES

[75] Inventors: Koichi Takahashi, Yokohama; Nobuteru Hitomi; Tokiyoshi Yanai, both of Yokosuka, all of Japan

[73] Assignee: Nissan Motor Company Limited, Yokohama, Japan

[22] Filed: Aug. 14, 1972

[21] Appl. No.: 280,177

[30] Foreign Application Priority Data
Aug. 19, 1971 Japan............................ 46-63254

[52] U.S. Cl............................ 74/89.15, 74/459
[51] Int. Cl............................................. F16h 27/02
[58] Field of Search......................... 74/89.15, 459

[56] References Cited
UNITED STATES PATENTS

| | | | |
|---|---|---|---|
| 2,159,225 | 5/1939 | Phelps et al. | 74/459 |
| 2,925,744 | 2/1960 | Folkerts | 74/459 |
| 2,945,392 | 7/1960 | Folkerts | 74/459 |
| 3,060,762 | 10/1962 | Lutz | 74/459 |
| 3,116,931 | 1/1964 | Edwards | 74/459 |
| 3,498,153 | 3/1970 | Wagner | 74/459 |

*Primary Examiner*—Samuel Scott
*Assistant Examiner*—Wesley S. Ratliff, Jr.

[57] ABSTRACT

Herein disclosed is a worm and reciprocating ball type steering gear having a worm shaft connected to a steering shaft and having an external helical groove, a nut member longitudinally movably fitting on the worm shaft and having an internal helical groove aligned with the opposed helical groove in the worm shaft, balls rolling in the grooves in the worm shaft and nut member, and a sector gear in mesh with a rack portion formed on the nut member. Rotation of the worm shaft as brought about by the rotation of the steering shaft is converted into longitudinal movement of the nut member and this movement, in turn, results in rotation of the sector gear. The rack portion of the nut member is generally curved in a quadratic formation in the direction of axis of the worm shaft so that the steering gear ratio is smoothly varied as the steering angle is varied during steering operation.

3 Claims, 11 Drawing Figures

WORM AND RECIPROCATING BALL TYPE STEERING GEAR FOR MOTOR VEHICLES

The present invention is concerned generally with steering systems of motor vehicles and, more particularly, the invention relates to a steering gear of the worm and reciprocating ball type for use in the motor vehicle.

The worm and reciprocating ball type steering gear to which the present invention is directed generally includes a worm shaft which is rotatable with a steering main shaft and accordingly with a steering wheel of the motor vehicle. The worm shaft has an external helical groove formed between axial ends thereof and received thereon a nut member having an internal helical groove which is aligned with the opposed helical groove in the worm shaft. The opposite helical grooves in the worm shaft and nut member receive an endless chain of steel balls which roll along the grooves as the worm shaft is rotated by the steering main shaft so that the nut member engaging the worm shaft through the balls is moved in parallel to an axis of rotation of the worm shaft. The nut member has external teeth forming a rack which is usually parallel to the axis of rotation of the worm shaft and accordingly to the direction of movement of the nut member along the worm shaft. The rack on the nut member is in mesh with a sector gear rotatable with a pitman arm shaft so that the longitudinal movement of the nut member is carried to the sector gear through the teeth on the side of the nut member. The sector gear, in turn, moves with the nut member so as to rotate the pitman arm shaft and thus activates the steering linkage. The balls in the helical grooves of the worm shaft and nut member recirculate from one end of the nut member to the other via a pair of ball return guide tubes providing an endless flow of the balls through the grooves in the worm shaft and nut member.

It is well known in the art that, for the purpose that the steering gears operate satisfactorily under various driving conditions of the motor vehicles, the steering gears should provide stability of steering operation during high-speed driving such as straight-ahead driving or highway driving and soft and stream-lined manipulation at the steering during relatively low speeds such as in garaging or turning at curves or corners. In respect of the steering angles, on the other hand, it is required that the steering angles be limited within a relatively small range under the high-speed or straight-ahead driving conditions of the motor vehicle and be varied in a considerably broad range during the low speed driving conditions. Thus, it is presently an ordinary practice to have the steering gears so arranged as to provide relatively small gear ratios when the steering angles are limited in the small range, viz., during the high-speed or straight-ahead driving conditions and relatively large gear ratios when the steering angles are varied broadly as in the case of the low speed or broadly steered driving conditions of the motor vehicle. A number of variants working on this particular principle have thus far been developed and put into practical use in the modern motor vehicles.

The prior art steering gear of the worm and reciprocating ball type as above described uses the rack having teeth with a straight basic pitch line which is parallel to an axis of rotation of the worm shaft so that the gear ratio achieved by the use of such steering gear varies rectilinealy as the steering angle is varied in either direction during the steering operation. As a consequence, the generating line of the teeth of the rack tends to cut into an intermeshing pitch line of the rack when the rack is in mesh with the sector gear through its teeth remote from the center of the rack, viz., the rack is moved away from its neutral position in which the motor vehicle is unsteered. This tends to create undercuts in those teeth of the sector gear which are remote from the center of the sector gear meshing with the rack. To avoid formation of such undercuts in the teeth of the sector gear, it is necessary to increase the distance between the axis of the worm gear and an axis of rotation of the sector gear or to form the teeth of the rack formed to provide irregular pressure angles. These expedients are, however, reflected by an increased size of the steering gear-box and intricacy of designing and engineering the rack and, as such, are not fully acceptible for practical purposes. Since, moreover, the gear ratio achieved by the prior art steering gear of the described construction varies linearly as the steering angle is varied, the gear ratio increases sudenly when the steering wheel is turned through the neutral point in either direction with the result that the engagement between the parts of the steering gear is more or less impaired.

It is, therefore, an object of the present invention to provide an improved steering gear of the worm and reciprocating type which is adapted to operate satisfactorily under the various driving conditions of the motor vehicle.

It is another object of the invention to provide an improved steering gear of the worm and reciprocating ball type by which stability of steering operation is achieved during relatively high speed driving such as straight-ahead or high-way driving of the motor vehicle and, yet, soft and streamlined steering manupulation is achieved during relatively low speed driving such as in garaging or turning at curves or corners.

It is still another object of the invention to provide an improved steering gear of the worm and reciprocating ball type which is adapted to provide gear ratios of a relatively small range when the motor vehicle is to be steered with an angle of a relatively small range and gear ratios of a relatively large range during a steering operation with a relatively large angle.

Yet, it is further and another object of the present invention to provide an improved steering gear of the worm and reciprocating type adapted to achieve steering gear ratios which are continuously varied as the steering wheel is turned.

It is further and another object of the invention to provide an improved steering gear of the worm and reciprocating ball type in which the teeth of the sector gear forming part of the steering gear is free from undercut which would otherwise result from the basic pitch line of the teeth of the rack cutting into the intermeshing the pitch curve of the rack when the rack is moved away from its neutral position.

It is further and another object of the invention to provide an improved steering gear of the worm and reciprocating ball type by which the steering of the motor vehicle can be carried out smoothly through the neutral point at which the steering direction is inverted.

It is further and another object of the invention to provide an improved steering gear of the worm and reciprocating ball type which is compact in construction and ready to be manufactured on a large-scaled commerical basis and to be installed in motor vehicles of any types.

These and other objects of the present invention are accomplished in a steering gear in which the nut member engaging with the worm shaft through the endless chain of the balls has a rack portion which is curved at least in its substantially central portion in a direction substantially parallel to an axis of rotation of the worm shaft, wherein the rack portion of the nut member and the sector gear in mesh with the rack member have complementary intermeshing pitch curves which roll on each other as the rack portion is longitudinally moved on the sector gear in a direction parallel to the axis of rotation of the work shaft. Thus, the intermeshing pitch curve of the rack portion of the nut member is at least in its central portion laid off by a circular or otherwise curved segment, whereby the steering gear ratio achieved by the steering gear is varied in a manner to follow a smooth curve as the steering angle is varied in either direction. In the absence of a sharply turning point in the variation in the gear ratio, steamlined steering operation is achieved even when the direction of steering is inverted from one to the other.

In one preferred embodiment of the steering gear having the above described basic feature, the intermeshing pitch curve of the rack portion of the nut member has a central portion which is laid off by a circular segment having a predetermined central angle and a predetermined radius, and opposite end portions which are laid off by respective substantially rectilinear segments parallel to the axis of rotation of the worm shaft. In this instance, the intermeshing pitch curve of the sector gear in mesh with the rack portion of the nut member has a central portion which is laid off by a curved segment complementary to the circular segment of the intermeshing pitch curve of the rack portion and opposite end portions which are laid off by respective substantially circular segments complementary to the rectilinear segments of the pitch curve of the rack portion. The arrangement of this particular nature is adapted to provide steering gear ratios which increase as the steering angles increase to predetermined limits in either direction and which are kept substantially constant when the steering angles increase beyond such limits. In another preferred embodiment of the steering gear according to the present invention, the intermeshing pitch curve of the rack portion of the nut member has at least in its central portion a sinusoidally curved segment so as to provide steering gear ratios which increase within a limited range as the steering angles increase and which are smoothly made constant from the limited range as the steering angles still increase. In this instance, the intermeshing pitch curve of the rack portion of the nut member may have opposite end portions which are laid off respective substantially rectilinear segments merging from the sinusoidally curved segments and, at the same time, the pitch curve of the sector gear may have a central portion which is laid off by a curve drawn by point on a circle rolling on the sinusoidally curved segment and opposite end portions which are laid off by respective substantially circular segments complementary to the rectilinear segments of the pitch curve of the rack portion of the nut member.

The intermeshing pitch curve of the rack portion of the nut member, the intermeshing pitch curve of the sector gear, and the relation between the steering gear ratio and steering angle can be determined if one of these variables is given.

The above described features of the steering gear according to the present invention are applicable to both the manually operated (or unassisted) and power assisted steering systems. Where, thus, the steering gear is used in the manually operated steering system, the rack portion of the nut member should be generally convex at least in its central portion so that the rack portion and sector gear have the intermeshing pitch curves which are at least in their central portions curved in directions opposite to each other. Where, on the other hand, the steering gear is to be used in the power assisted steering system in which the steering gear ratio is decreased as the steering angle increases, the rack portion of the nut member should be generally concave at least in its central portion so that the rack portion and sector gear have intermeshing pitch curves which are curved at least in their central portions in the same direction.

Other objects, features and advantages of the steering gear according to the present invention will become more apparent from the following description taken in conjunction with the accompanying drawings in which like reference numerals and characters designate corresponding parts and dimensions and in which.

Figure 10:
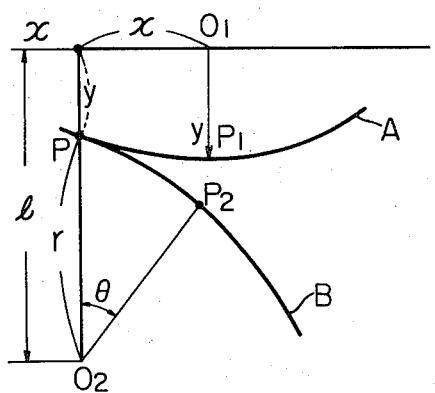
Figure 11:
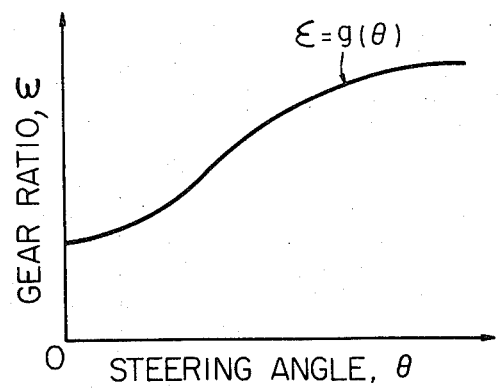

FIG. 10 is an analytic view showing the relation between the intermeshing pitch curves of the rack and sector gear of the steering gear according to the present invention as determined in a modified manner; and FIG. 11 is a graph showing a relation between the steering gear ratio and steering angle as used to determine the intermeshing pitch curves of the rack and sector gear in a still modified manner.

Figure 1:
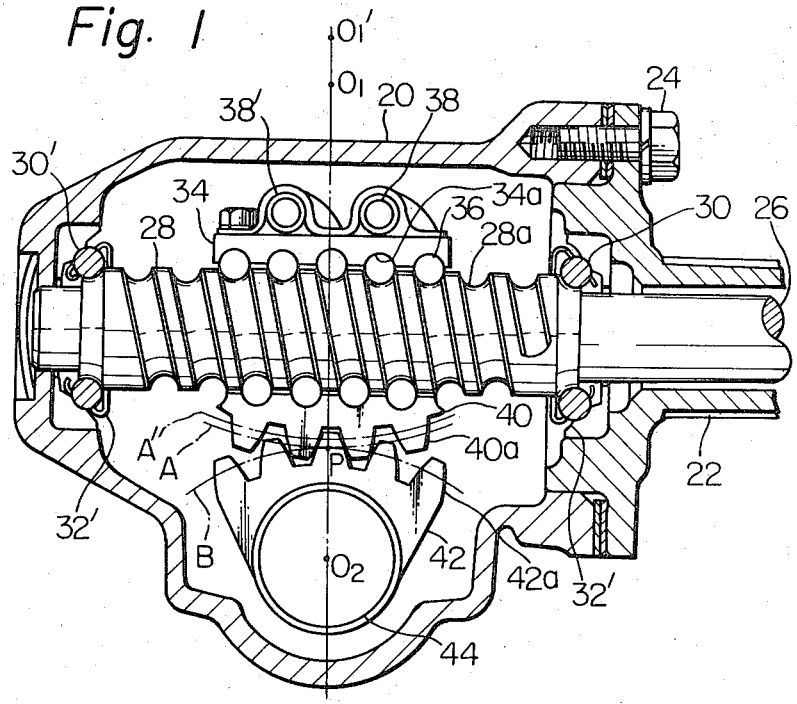
FIG. 1 is a longitudinal sectional view showing a preferred embodiment of the steering gear according to the present invention.

Reference is now made to the drawings, first to FIG. 1 which shows an overall construction of the steering gear of the worm and reciprocating ball type in accordance with the present invention. As illustrated, the steering gear unit includes a steering gear housing 20 which is rigidly connected to a lower end of a steering column or tube 22 by a lock nut 24. The steering column 22 receives therein a steering main shaft 26 which, in turn, is connected at its upper end to a steering wheel (not shown), as customary.

A worm shaft 28 extends axially from a lower end of the steering main shaft 26 and is supported at its ends on the steering housing 20 by means of upper and lower worm bearings 30 and 30', respectively. These bearings 30 and 30' are usually held in position by bearing retainers or cups 32 and 32', respectively, as shown. The worm shaft 28 has an external groove 28a formed between the worm bearings 30 and 30'. A nut member 34 fits axially movably on the worm shaft 28. The nut member 34 is formed with an internal helical groove 34a which is aligned with the external groove 28a in the worm shaft 28. A series of steel balls 36 fill the aligned opposite grooves 28a and 34a in the worm shaft 28 and nut member 34, respectively, in a manner to roll along the closed path formed by these grooves 28a and 34a as the worm shaft 28 is rotated about its axis. To provide an endless chain the balls 36 between the ends of the nut member 34, a pair of ball return guide tubes 38 and 38' are provided which permit the balls 36 to recirculate from one end of the nut member 34 to the other through the path formed by the grooves 28a and 34a.

The nut member 34 has formed integrally therewith a rack portion 40 having an external teeth 40a. This rack portion 40 is curved generally in the direction of the worm shaft 28 with its central portion protruded outwardly from the worm shaft as illustrated. The rack portion 40 of the nut member 34 is in constant mesh with two-lobed sector gear 42 having external teeth 42a. The sector gear 42 is connected to and rotatable with a shaft 44 which may be a pitman arm shaft forming part of the steering linkage as usual.

The rack portion 40 of the nut member 34 has an intermeshing pitch curve A which is laid off by a circular segment having a point $O_1$ as a center and a basic pitch curve A' which is laid off by a circular segment having a point $O_1'$ as a center. The sector gear 42, on the other hand, has an intermeshing pitch curve B which is eccentric to an axis $O_2$ of rotation of the shaft 44, as shown.

During operation, the worm shaft 28 is rotated about its axis together with the steering main shaft 26 from the steering wheel (not shown) so that the balls 36 move along the helical path between the grooves 28a in the worm shaft 28 and the grooves 34a in the nut member 34, causing the nut member 34 to move in parallel to the axis of rotation of the worm shaft 28 in a direction depending upon the direction of rotation of the worm shaft. The movement of the nut member 34 is carried to the sector gear 42 through the rack portion 42 of the nut member with the result that the sector gear 42 is rotated about the point $O_2$ through an angle dictated by the central angle through which the worm shaft 28 is rotated about its axis. During the longitudinal movement of the nut member 34, the balls 36 roll-ing between the aligned grooves 28a and 34a recirculate from one end of the nut member to the other through the pair of ball return guide tubes 38 and 38'.

The steering gear ratio established in this manner is proportional to a distance between the center $O_2$ of rotation of the sector gear 42 and a point P of contact between the pitch curves A and B of the rack portion 42 of the nut member 40 and the sector gear 42, respectively. The variation of the gear ratio in terms of the angle of rotation of the sector gear 42 is indicated by curve $a$ in FIG. 2.

Figure 2:
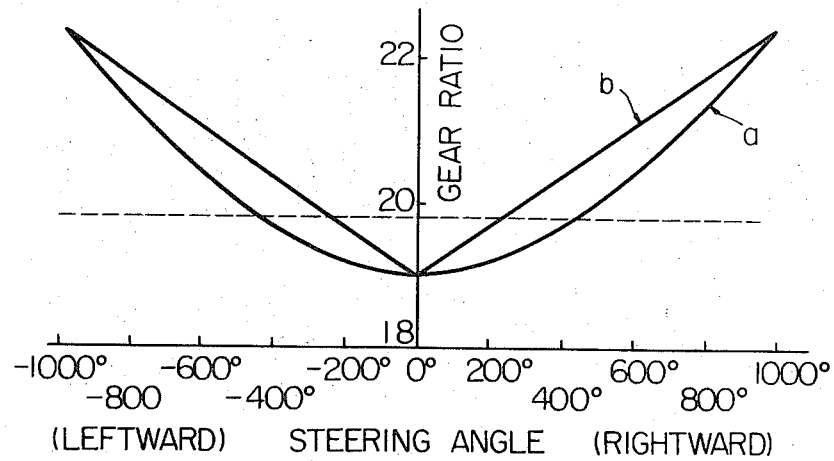
FIG. 2 is a graph showing variations in the steering gear ratio in terms of the steering angle as achieved in the prior art steering gear of the described type and in the steering gear according to the present invention.

In FIG. 2, the variation of the steering gear ratio obtained by a prior art steering gear using a straight rack is indicated by a plot $b$ which, as seen, has a vertex at its bottom corresponding to a neutral point at which the steering angle is zero, viz., to a condition in which the motor vehicle is driven straight forward. In contrast to the steering gear ratio thus provided by the prior art steering gear of the worm and reciprocating ball type, the curve $a$ of the gear ratio achieved by the steering gear of the construction shown in FIG. 1 passes through the neutral point smoothly so that the direction of steering is inverted in a streamlined condition during the steering operation as previously noted.

Figure 3:
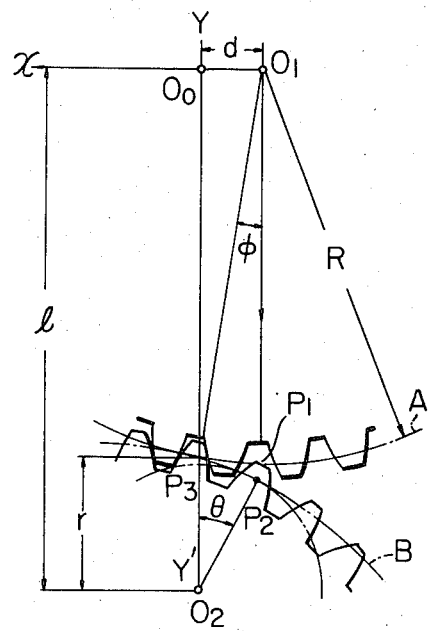
FIG. 3 is an analytic view showing the principle of operation of the steering gear shown in FIG. 1.

The mode of operation of the steering gear shown in FIG. 1 will be more clearly be understood from FIG. 3. Referring to FIG. 3, it is assumed that the pitch curves A and B of the rack portion 40 of the nut member and the sector gear 42, respectively are in contact with each other at points $P_1$ and $P_2$ thereon in the neutral position of the steering gear and come in contact at a common point $P_3$ when the rack portion 40 is moved along the worm shaft a distance $d$. Under the condition in which the intermeshing pitch curves A and B are in contact with each other at point $P_3$, the point $P_3$ must be found on a line YY' which is drawn perpendicularly from the center $O_2$ of rotation of the sector gear 42 to a line $O_1O_o$ drawn in the direction of movement of the rack portion 40 of the nut member wherein the point $O_o$ lies on the line YY'. If, in this instance, the length of the line YY' is $l$ and if $\angle P_1O_1P_3 = \phi$, $\angle P_2O_2P_3 = \theta$, $O_1P = R$ and $O_2P = r$, then, in view of a relation in which an arc $P_1P_3$ equals an arc $P_2P_3$, $$r \cdot d\theta = R \cdot \cos\phi \cdot d\phi, \text{ and} \quad \quad 1$$

$$r = l - R \cdot \cos\phi. \quad \quad 2$$

From Eqs. 1 and 2, it follows that $$\theta = \int \frac{R \cdot \cos\phi}{l - R \cdot \cos\phi} d\phi + C$$

$$= -\phi + \frac{2L}{\sqrt{l^2 - R^2}} \cdot \tan^{-1}\frac{\sqrt{l^2 - R^2}\tan(\phi/2)}{l - R} + C, \quad \quad (3)$$

where C is a constant.

Since $\phi = 0$ and $\theta = 0$ during the neutral condition of the steering gear, $C = 0$ so that Eq. 3 is rewritten $$\theta = -\phi + (2l)/(\sqrt{l^2 - R^2}) \cdot \tan^{-1}(\sqrt{l^2 - R^2}\tan(\phi/2)/(l - R)) \quad 3'$$

Eliminating $\phi$ from Eqs. 2 and 3', there will result $$r = f(\theta) \quad \quad 4$$

which is a function in terms of the angle $\theta$ determining the pitch curve B of the sector gear 42.

If, now, the steering gear ratio achieved in the steering gear of the construction shown in FIG. 1 is denoted by $\epsilon$, then the gear ratio $\epsilon$ is expressed as a ratio between the angles of rotation of the worm shaft 28 and the sector gear 42 so that, if the worm shaft 28 has a lead L and a radius of the pitch circle of the sector gear at a given instant is $r$, then $$\epsilon = 2\pi r/L \tag{5}$$

When, thus, a gear ratio $\epsilon_o$ to be achieved in the neutral condition and a gear ratio $\epsilon$ to be achieved in a condition in which the sector gear 42 is rotated through an angle of $\theta_1$ are given, then the radii $r_o$ and $r_1$ resulting respectively therefrom are given by $$r_o = (L/2\pi)\epsilon_o, \text{ and} \tag{6}$$

$$r_1 = (L/2\pi)\epsilon_1 \tag{7}$$

Since, moreover, $\phi = 0$ when $\theta = 0$, from the relation of Eq. 2, $$r_o = l - R \tag{8}$$

and if $\phi = \phi_1$ when $\theta = 0$ then in view of the relation of Eq. 2, $$r_1 = l - R \cdot \cos\phi_1 \tag{9}$$

From Eq. 3', there holds $$\theta_1 = -\phi_1 + 2l/(l^2 - R^2) \cdot \tan^{-1}[\sqrt{l^2 - R^2}/(l - R) \cdot \tan(\phi/2)] \tag{10}$$

The values of $l$, $R$ and $\phi_1$ will be obtained by solving these Eqs. 8, 9 and 10 so that the radius R of the pitch curve A of the rack portion 40 of the nut member is determined.

If, for instance, the desired steering gear ratio $\epsilon$ is determined so that $\epsilon_o = 19$ when $\theta = 0°$ and $\epsilon_1 = 22.5$ when $\theta = 45°$, then
$r_o = 28.80$ mm,
$r_1 = 34.10$ mm, and
$R = 56.58$ mm.

The relation thus obtained between the steering angle $\theta$ and the resultant gear ratio $\epsilon$ is in correspondence with the curve $a$ in FIG. 2.

Figure 4:
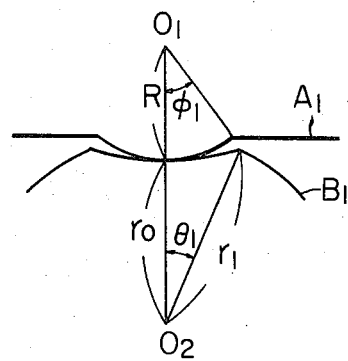
FIG. 4 is an analytic view schematically showing the relation between pitch curves of the rack and sector gear of another preferred embodiment of the steering gear according to the present invention.

FIG. 4 illustrates another preferred embodiment of the steering gear according to the present invention wherein the steering gear ratio is increased within a predetermined range as the steering angle increases and is maintained at a constant value when the steering angle further increases beyond such range. Thus, the rack portion of the nut member has an intermeshing pitch curve $A_1$ having a central portion laid off by a circular segment and opposite end portions laid off by respective rectilinear sections which are substantially parallel to the axis of rotation of the worm shaft. The circular section of the intermeshing pitch curve $A_1$ has a radius R and a central angle $2\phi_1$ and satisfies the relations determined by Eqs. 8, 9 and 10. The sector gear, on the other hand, has an intermeshing pitch curve $B_1$ having a central portion laid off by a curved segment satisfying the relation of Eq. 4 so as to be complementary to the circular segment of the intermeshing pitch curve $A_1$ of the rack portion and opposite end portions laid off by respective circular segments merging from the curved central portion of the intermeshing pitch curve $B_1$. The curved central portion of the pitch curve $B_1$ thus has a central angle of $2\theta_1$ and a central point located at a distance $r_o$ from the center of rotation of the sector gear while the circular end portions of the intermeshing pitch curve $B_1$ has a radius $r_1$ as illustrated.

Figure 5:
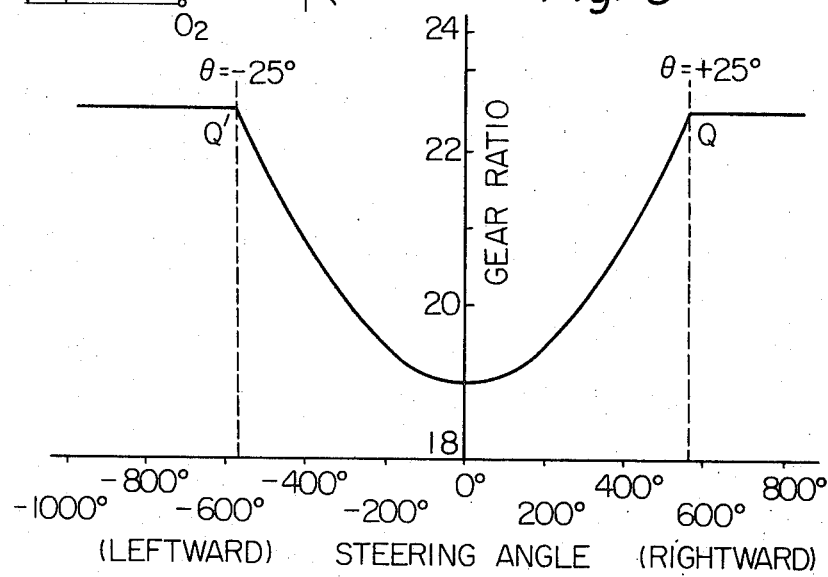
FIG. 5 is a graph showing the variation in the steering gear ratio in terms of the steering angle as achieved by the steering gear operating on the principle indicated in FIG. 4.

FIG. 5 illustrates an example of the variation of the gear ratio achieved by the construction of the steering gear shown in FIG. 4 in which the gear ratio is made constant in the ranges of $|\theta| \geq 25°$ and in which $\epsilon_o = 19$ when $\theta = 0$ and $\epsilon_1 = 22.5$ when $\theta = \pm 25°$ so that the dimensions of the rack portion of the nut member and the sector gear are determined as follows:
$r_o = 28.80$ mm,
$r_1 = 34.10$ mm and
$R = 19.21$ mm.

Thus, the rack portion of the nut member has an intermeshing pitch curve having a circular segment with a radius 19.21 within the range of $|\phi| \leq 43.62°$ and rectilinear segments parallel to the axis of rotation of the worm shaft within the ranges of $|\phi| \geq 43.62°$. The sector gear, on the other hand, has an intermeshing pitch curve having a curved segment dictated by Eq. 4 within the range of $|\theta| \leq 25°$ and circular sections with a radius of 34.10 mm within the ranges of $|\theta| \geq 25°$.

In order that the curved segment of the plot shown in FIG. 5 merge into the rectilinear segments, it is preferable that the intermeshing pitch curve of the rack portion of the nut member be curved in a sinusoidal fashion. In this instance, if an $x$–$y$ coordinate is established with the point $O_o$ as origin as indicated in FIG. 3, and if the intermeshing pitch curve of the rack portion is given by $$y = y_1 \cdot \cos(x_1 \cdot x), \tag{11}$$

wherein $y_1$ and $x_1$ are constant parameters, then the intermeshing pitch curve of the sector gear within the ranges of $|\theta| \leq \theta_1$ will be given by $$r = l - y_1 \cdot \cos(x_1 \cdot x), \text{ and} \tag{12}$$

$$\theta = \int \frac{dx}{l - y_1 \cdot \cos(X_1 \cdot x)}$$

$$= \frac{2}{x_1 \sqrt{l^2 - x_1^2}} \cdot \tan^{-1}\left(\sqrt{\frac{l + y_1}{l - y_1}} \tan(x_1 \cdot x)\right). \tag{13}$$

For the purpose that the steering gear ratio be smoothly made constant once the steering angle increases beyond $\theta_1$ in either direction, the parameters $y_1$, $x_1$ and $l$ may be determined as follows:

$$y_1 = l - r_o, \tag{14}$$

$$x_1 = \pi/(\theta_1 \cdot \sqrt{l^2 - x_1^2}) \text{ and} \tag{15}$$

$$l = (r_1 + r_o)/2 \tag{16}$$

Figure 6:
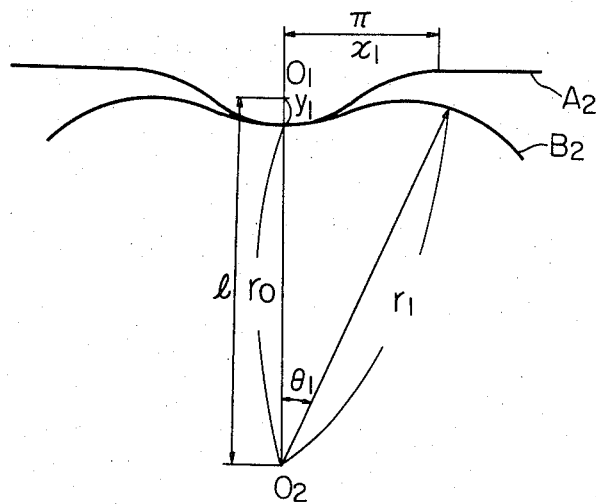
FIG. 6 is an analytic view schematically showing the relation between intermeshing pitch curves of the rack and sector gear of still another preferred embodiment of the steering gear according to the present invention.

FIG. 6 illustrates an embodiment in which the rack portion of the nut member has an intermeshing pitch curve $A_2$ having a sinusoidally curved segment in its central portion and substantially rectilinear segments merging from the sinusoidally curved segment wherein the desired steering gear ratio is determined so that $\epsilon_o = 19$ when $\theta = 0$ and $\epsilon_1 = 22.5$ when $|\theta| \geq 25°$ as in the case of the embodiment shown in FIG. 4. The parameters $y_1$, $x_1$ and $l$ obtained in this instance are as follows:

$y_1 = 2.65$ mm,
$x_1 = 0.23$ mm and $l = 31.46$ mm.

Figure 7:
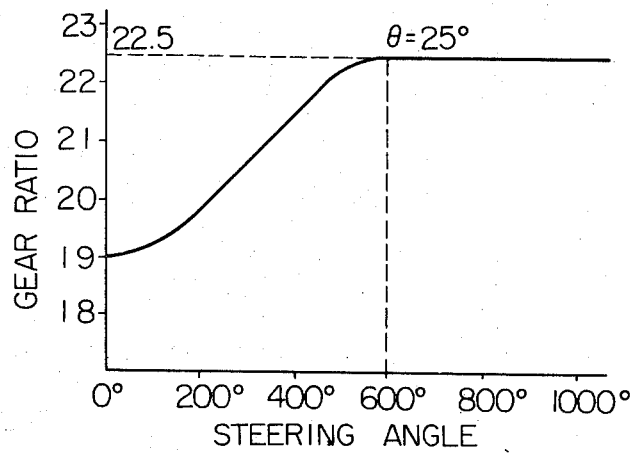
FIG. 7 is a graph showing the variation in the steering gear ratio in terms of the steering angle as achieved by the steering gear operating on the principle indicated in FIG. 6.

The sector gear, on the other hand, has an intermeshing pitch curve $B_2$ which has a central portion laid off by a curved segment dictated by the above indicated Eqs. 12 and 13 within the ranges of $|\theta| \leq \theta_1$ and opposite end portions laid off by respective circular segments merging from the curved segment. The plot indicating the variation in the steering gear achieved in this manner is illustrated in FIG. 7.

The intermeshing pitch curves of the rack portion of the nut member and the sector gear in mesh with the rack portion in the steering gear according to the present invention are determined in the above described manner. The basic pitch curve of the teeth of the rack portion of the nut member is at least partly curved identically with or at least analogous to the intermeshing pitch curve of the rack portion of the tooth profiles of the sector gear will be determined through selection of the teeth, which may be straight or involute, of the rack portion.

Figure 8:
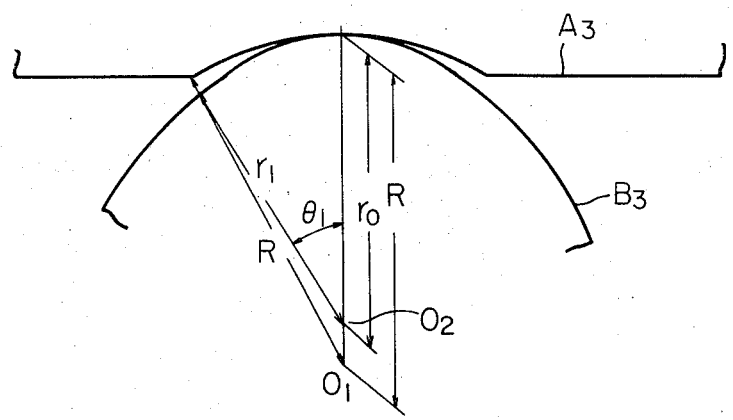
FIG. 8 is an analytic view schematically showing the relation between the pitch curves of the rack and sector gear of a preferred embodiment of the steering gear for use particularly in a power assisted steering system.

FIG. 8 illustrates an embodiment of the steering gear according to the present invention as applied to the power assisted steering systems. The power assisted steering system in general is so constructed and arranged that the steering effort is relieved to a considerable extent and, as such, it is necessary that the steering gear ratio be increased in the vicinity of the neutral point for the purpose of preventing abrupt steering as accidentally encountered during the straight-ahead driving and decreased gradually as the steering angle increases, contrary to the manually operated steering system. Thus, in the embodiment shown in FIG. 8, the rack portion of the nut member is shown to have an intermediate pitch curve $A_3$ having a central portion which is laid off by a segment concavely curved toward the worm shaft and opposite end portions which are laid off by rectilinear segments merging from the curved segment. The curved segment of the intermeshing pitch curve $A_3$ satisfies the relations of Eqs. 8, 9 and 10 or the relation of Eq. 11. The sector gear to be in mesh with the thus constructed rack portion of the nut member has an intermeshing pitch curve $B_3$ which is dictated by the relation of Eq. 4 or which has a central portion laid off by a curved segment dictated by Eq. 4 and opposite end portions which are laid off by respective circular segments dictated by Eq. 7. Where the intermeshing pitch curve $A_3$ is curved sinusoidally as dictated by Eq. 11, then the curved segment of the intermeshing pitch curve $B_3$ is obtained from the relations of Eqs. 12 and 13 as will be readily understood.

Figure 9:
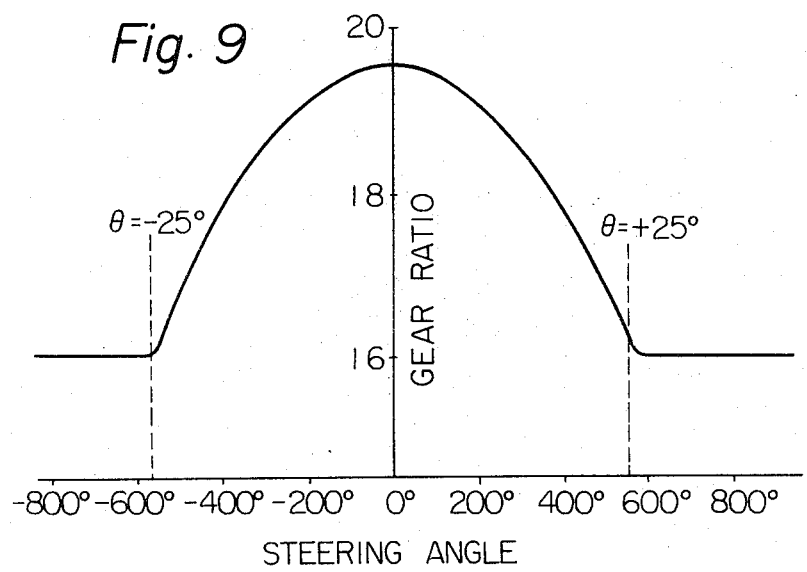
FIG. 9 is a graph showing the variation in the steering gear ratio in terms of the steering angle as achieved by the steering gear operating on the principle indicated in FIG. 8.

An example of the variation in the steering gear ratio achieved in the steering gear of the power assisted steering system having the above described feature is illustrated in FIG. 9 wherein the gear ratio peaks up at the neutral position of the steering gear and decreases as the steering angle increases in either direction. When the steering angle increases beyond a predetermined limit, then the steering gear ratio is maintained constant as seen in FIG. 9.

It has been thus far assumed that the intermeshing pitch curve of the rack portion of the nut member is first given to predominant over the intermeshing pitch curve of the sector gear and the relation between the steering angle (which is identical with the angle of rotation of the sector) and the resultant steering gear ratio. Such is, however, merely by way of example and, where desired, the pitch of the sector gear or the desired relation between the steering angle and the gear ratio may be first given so as to determine the remaining two variables.

If, thus, the intermeshing pitch curve A of the rack portion is first given as by a relation $$r = F(\theta) \qquad 17$$

then the resultant steering gear ratio $\epsilon$ will be obtained as $$\epsilon = 2\pi/LF(\theta) \qquad 18$$

If, in this instance, an $x$–$y$ coordinate is taken with its axis of abscissa passing through the center $O_1$ of the pitch curve A of the rack portion and its axis of ordinate passing through the center $O_2$ of rotation of the sector gear as indicated in FIG. 10, then the intermeshing pitch curve A of the rack portion will be given from the relations $$x = \int_0^\Theta F(\Theta)d\Theta, \quad \text{and} \qquad (19)$$

$$y = l - F(\theta) \qquad 20$$

If, on the other hand, a desired relation between the steering angle $\theta$ and the resultant steering gear ratio $\epsilon$ is first given by $$\epsilon = g(\theta) \qquad 21$$

then the sector gear will have an intermeshing pitch curve which is determined by an equation $$r = L/2\pi \cdot g(\theta) \qquad 22$$

while the rack portion of the nut member will have an intermeshing pitch curve which is determined by $$x = \frac{L}{2\pi} \int_0^\Theta g(\Theta)d\Theta, \quad \text{and} \qquad (23)$$

$$y = l - L/2\pi \cdot g(\theta) \qquad 24$$

The function $\epsilon = g(\theta)$ may be such that is indicated graphically indicated in FIG. 11. The method of determining the pitch curves of the rack portion and sector gear from the relation between the steering angle and gear ratio as above described will provide advantageous in providing simplicity of design and engineering of the rack and sector of the steering gear of the construction herein proposed.

It will now be appreciated from the foregoing description that, since the basic pitch curve for producing the teeth of the rack is made identical with or at least analogous to the intermeshing pitch curve of the rack in the steering gear according to the present invention, an undercut in the tooth of the sector gear to mesh with the rack is completely avoided so that the rack can be readily generated by means of hobbing or by the use of a pinion cutter or formed by indexing the blank for the rack. In addition, the steering gear according to the present invention is adapted to provide streamlined steering operation especially through the neutral position of the steering gear because a sharp change is encountered in the variation of the steering gear ratio.

What is claimed is:

1. A steering gear comprising: a housing; a worm shaft rotatably supported in said housing; a nut fitting said worm shaft for longitudinal movement therealong having a segment rack on one side thereof, said segment rack having a basic pitch curve which is a quadratic curve approximating an intermeshing pitch curve of said rack; a rock shaft transversely mounted in said housing and a sector gear carried by said rock shaft and formed complementary to said segment rack, 2. A steering gear as claimed in claim 1, wherein the basic pitch curve of said segment rack is a part of circle.

3. In a steering gear having a housing; a worm shaft rotatably supported in said housing; a nut fitting said worm shaft for longitudinal movement therealong having a segment rack on one side thereof; a rock shaft transversely mounted in said housing and a sector gear carried by said rock shaft, the improvement wherein said segment rack has a basic pitch curve which is a part of circle approximating an intermeshing pitch curve of said rack, and wherein said sector gear is formed complementary to said segment rack.

* * * * *